March 15, 1932.     H. W. PLEISTER     1,849,804
SPRING TOGGLE
Filed Feb. 7, 1930     2 Sheets-Sheet 1
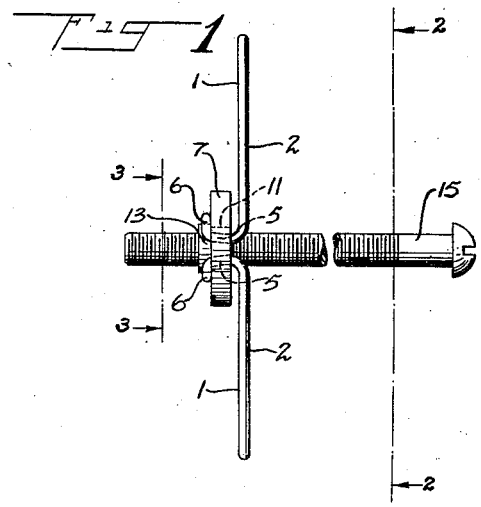
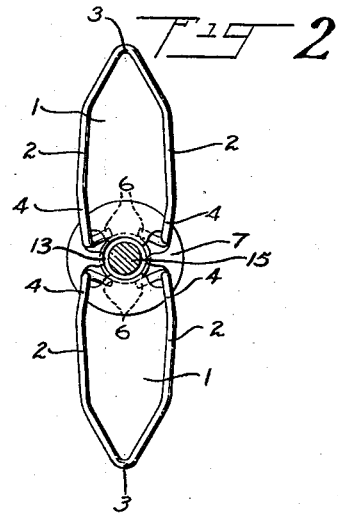
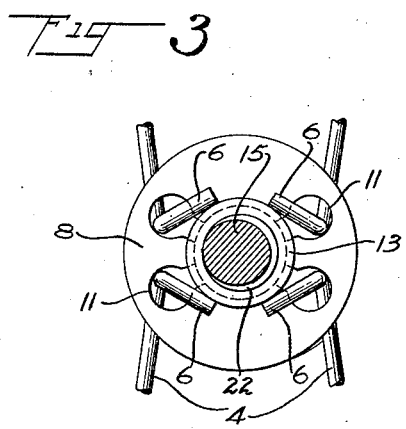
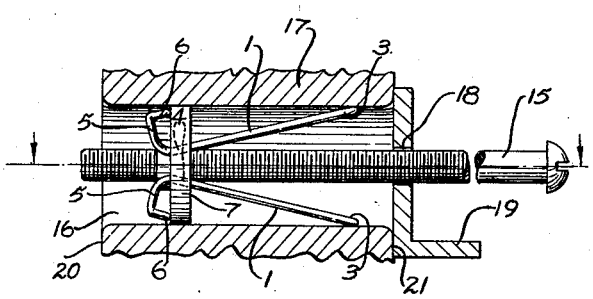
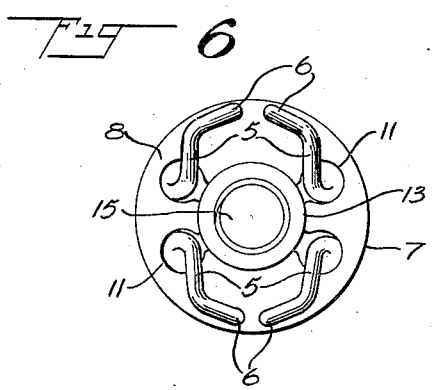
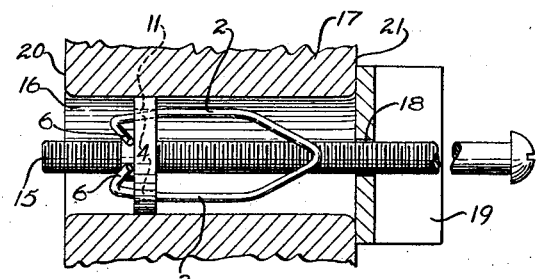
INVENTOR.
Henry W. Pleister
BY
ATTORNEY March 15, 1932. H. W. PLEISTER 1,849,804
SPRING TOGGLE
Filed Feb. 7, 1930   2 Sheets-Sheet 2
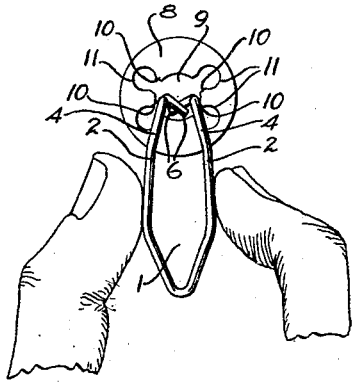
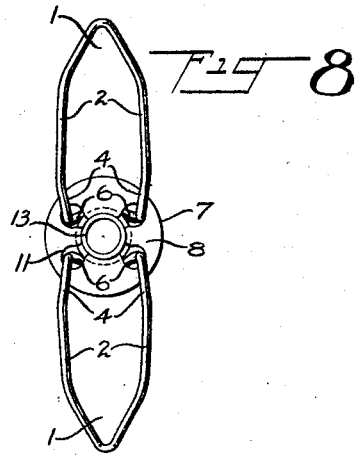
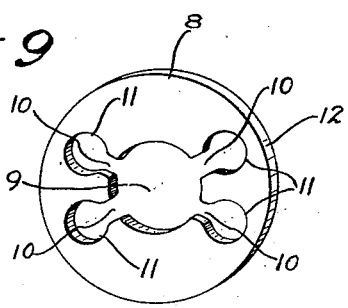
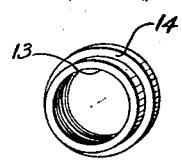
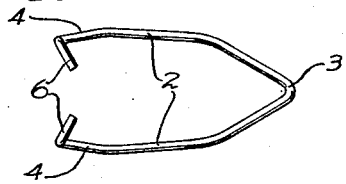
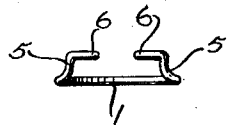
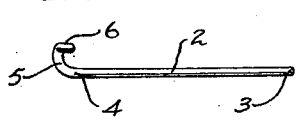
Henry W. Pleister
INVENTOR.
BY Alanbu Johnson
ATTORNEY Patented Mar. 15, 1932

1,849,804

UNITED STATES PATENT OFFICE

HENRY W. PLEISTER, OF WESTFIELD, NEW JERSEY, ASSIGNOR TO HENRY B. NEWHALL CORPORATION, OF GARWOOD, NEW JERSEY, A CORPORATION OF NEW JERSEY

SPRING TOGGLE

Application filed February 7, 1930. Serial No. 426,599.

My invention relates to a new and improved spring toggle, to secure objects to walls, ceilings, or other supports, where it is impossible, or not feasible, to get behind the support to manually apply a nut, or other fastening member, to the bolt supporting the work.

My invention further relates to certain combinations, sub-combinations, and articles of manufacture as will be more fully hereinafter described and pointed out in the claims.

In the accompanying drawings I have shown an illustrative embodiment of my invention, simply by ways of example, though it is to be distinctly understood that may invention is not to be confined to this particular form. In these drawings the same reference numerals refer to similar parts in the several figures.

Fig. 1 is a side elevation.

Fig. 2 is a sectional view, on line 2, 2 of Fig. 1, looking in the direction of the arrows, the wings and nut being shown in front elevation.

Fig. 3 is a fragmentary vertical section, on line 3, 3 of Fig. 1, on an enlarged scale, the nut and engaging hooks being shown in rear elevation.

Fig. 4 is a vertical section through a support, illustrating the spring toggle being placed in position.

Fig. 5 is a horizontal section, on line 5, 5 of Fig. 4, looking down in the direction of the arrows.

Fig. 6 is a detail rear view of Fig. 4, on an enlarged scale.

Fig. 7 is a detail view of one member of the wing support illustrating the first step in applying one of the wings.

Fig. 8 is a detail view of the complete wing supporting member, with the wings held in position.

Fig. 9 is a detail perspective view of the nut disc on an enlarged scale.

Fig. 10 is a perspective view of the nut, with which the nut disc forms the wing supporting member.

Fig. 11 is a plan view of one of the spring wings.

Fig. 12 is a side elevation of one of the spring wings.

Fig. 13 is a rear elevation of the spring wing of Fig. 11.

My improved spring toggle is of few parts, and can be quickly and easily assembled. No spring, or springs, other than the spring wings themselves are employed.

The wing supporting member is preferably formed of a plurality of parts. But neither of the parts is swaged, shaped or otherwise manipulated to form domes, channels, elevations or depressions to act as wedge or similar actuating surfaces.

Further, for a spring toggle of a given holding power, it requires a smaller hole than any prior to my invention. This is very important when it is considered that the holes have to be drilled, and that the larger the hole the more difficult it is to drill it, and the more it defaces the surface of the wall, ceiling or other support.

For example, one size of my spring toggle requires but a $\frac{5}{8}$th inch hole, actual size, and not a hole made with a $\frac{5}{8}$th inch drill which, in practice, makes a hole $\frac{11}{16}$ths inch in diameter. This minimum size hole applies to all sizes of my spring toggle, the size given being simply by way of example.

In the particular form of my spring toggle, which I have shown by way of illustration, I employ two spring wings 1, 1 each preferably formed of wire bent back on itself to form the two sides 2, 2 and the head 3. The sides 2, 2 are bent inward slightly at 4, 4, then downward at 5, 5, the very ends 6, 6 being bent towards each other. The portions 5, 5 and 6, 6 form hooks to co-operate with the wing supporting member 7.

In my invention this member 7 is formed of a plurality of parts, two being preferably employed. The portion 8 is formed of a flat metal stamping, preferably a steel stamping, and is provided with an axial bore 9, and with four radial slots 10, 10, each radial slot preferably terminating in an enlarged portion which does not extend to the periphery 12 of the disc 8.

The spring wings 1, 1 are positioned in the disc 8 by compressing the sides 2, 2, as shown in Fig. 7, bringing the hook portions 6, 6 adjacent to each other and into the axial bore 9. By releasing the pressure on the sides 2, 2, and at the same time pulling slightly down on the spring wing 1, Fig. 7, the two hooks 6, 6, will be located in adjacent radial slots 10, 10, Fig. 8. The second spring wing 1 is located in the other radial slots 10, 10 in a similar manner.

After the spring wings are so located in the disc 8 they are locked in their respective radial slots and at the same time the disc is provided with a screw threaded member, by pressing, or riveting, or driving, or otherwise positioning the nut 13 within the axial bore 9 of the disc 8, so that there is no relative movement between the nut 13 and the disc 8. The flange 14 on the nut will limit the inward movement of the nut within the axial bore 9 of the disc.

It is particularly advantageous to use the secondary member 13, for in attempting to tap the axial bore 9 of the disc 8, the tap will catch, bind or possibly break, or have a tendency to do so, at the interruptions formed by the radial slots 10, 10. It is further advantageous to use the secondary member, or nut 13, as it gives increased bearing surface, with its full threads for the stove or other bolt 15, preventing any stripping of the threads, if an excessive load is thrown on the bolt. Moreover, the nut 13 forms a lock holding the spring wings 1, 1 in the wing supporting member, so that the wings cannot be accidentally or intentionally removed, without the use of pliers or similar tools. The nut 13 also serves to stiffen the disc 8, so that the disc could be formed of thinner and cheaper metal, without risk of its distorting or buckling under an unusual load.

In use, a hole 16 of the minimum diameter for the particular size spring toggle to be employed is drilled, or otherwise formed, in the masonry, terra cotta, concrete, brick, metal, or other support 17. The stove, or other, bolt 15 is then passed through the hole 18 in the bracket 19, or other work to be supported, and threaded into the wing supporting member. The ends or heads 3, 3 of the spring wings are then rocked in their pivoted bearings and brought down adjacent to the bolt 15, the toggle then being pushed through the hole 16, Fig. 4.

When the spring wings 1, 1 are brought down into the position shown in Fig. 4 the bent portions 4, 4 of the wings co-operate with the walls of the slots 11, 11 in which they are mounted, causing the two sides 2, 2 of each spring wing to approach each other. This places the wings 1, 1 under tension. At the same time the hooks 6, 6 approach each other on the rear of the disc 8, the bent portions 4, 4 moving slightly to the rear through the respective radial slots 10, 10.

The moment that the ends or heads 3, 3 pass the inner surface 20 of the support, the spring wings will no longer be confined by the surface of the hole 16, so that they will fly out, from the position shown in Figures 4 and 5 back to their original position shown in Figure 1.

By then screwing up on the stove or other bolt the work 19, of whatever character it might be, will be securely held to the surface 21 of the support 17.

Having thus described this invention in connection with an illustrative embodiment thereof, to the details of which I do not desire to be limited, what is claimed as new and what is desired to secure by Letters Patent is set forth in the appended claims.

What I claim is:—

1. The combination in a spring toggle, of a wing supporting member formed of a flat metal disc having an axial bore and slots for the reception of spring wings, and a nut adapted to be seated and held in the axial bore of the disc and lock the spring wings in the wing supporting member, and a bolt.

2. The combination in a spring toggle, of a wing supporting member formed of a flat metal disc having an axial bore and radial slots extending out from the axial bore towards but not to the circumference of the disc, spring wings having their ends pivotally mounted in the radial slots, and means to lock said wings in their respective slots, said means adapted to co-operate with a bolt, and a bolt.

3. The combination in a spring toggle, of a wing supporting member formed of a flat metal disc having an axial bore and radial slots extending out from the axial bore towards but not to the circumference of the disc, spring wings having their ends pivotally mounted in the radial slots, and a nut to lock said wings in their respective slots, said nut adapted to co-operate with a bolt, and a bolt.

4. A new article of manufacture for a spring toggle comprising a wing supporting member formed of a flat disc provided with an axial bore and radiating slots, and a nut secured within the axial bore of the disc adapted to lock the spring wings to the wing supporting member.

5. The combination in a spring toggle, of a wing supporting member formed of a flat metal disc provided with means to co-operate with wire spring wings, wire spring wings formed by bending a piece of spring wire back on itself and a nut to co-operate with a bolt, said nut being a part of the wing supporting member and adapted to lock the spring wings to the wing supporting member, and engage said bolt.

HENRY W. PLEISTER.